United States Patent [19]

Menary et al.

[11] Patent Number: 4,511,587

[45] Date of Patent: Apr. 16, 1985

[54] ENZYME INACTIVATED HOPS

[75] Inventors: Robert C. Menary, Taroona; Peter E. Doe, Sandy Bay, both of Australia

[73] Assignee: The University of Tasmania, Tasmania, Australia

[21] Appl. No.: 455,737

[22] Filed: Jan. 5, 1983

[30] Foreign Application Priority Data

Jan. 7, 1982 [AU] Australia .............................. PF2201

[51] Int. Cl.$^3$ .......................... C12C 3/00; A23L 3/16; A23L 3/34
[52] U.S. Cl. .................................... 426/271; 426/321; 426/600
[58] Field of Search ................. 426/600, 16, 271, 321, 426/592

[56] References Cited

U.S. PATENT DOCUMENTS

| | | | |
|---|---|---|---|
| 2,686,723 | 8/1954 | Chenicek | 426/271 |
| 2,748,002 | 5/1956 | Kneen | 426/271 |
| 3,956,513 | 5/1976 | Clarke et al. | 426/600 |
| 4,123,561 | 10/1978 | Grant | 426/600 |
| 4,299,853 | 11/1981 | Kleyn | 426/271 |

*Primary Examiner*—Elizabeth J. Curtin
*Assistant Examiner*—Elizabeth C. Weimar
*Attorney, Agent, or Firm*—Fleit, Jacobson, Cohn & Price

[57] ABSTRACT

A process for the production of hops which process includes treating the hops in such a manner that the activity of the enzyme "α-acid oxidase" is significantly reduced or halted. Hops produced by the abovementioned process maintain their "bitterness" qualities.

2 Claims, No Drawings

ENZYME INACTIVATED HOPS

The present invention relates to hops and in particular hops which have been modified to improve their use in the manufacture of hop-containing beverages including beer and the like. In a further aspect, the present invention relates to a method of manufacturing hop-containing beverages including beer and the like.

Hops are grown in large quantities in Australia and elsewhere. When the plants have reached maturity they are cut down and stored in drying installations known as Oast houses. Once the hops are dried they are then shipped to a brewery or are stored for a period before shipping. Unfortunately, the quality of the hops to provide "bitterness" in beer or like beverages appears to diminish over time.

Accordingly, it is an object of the present invention to overcome or at least alleviate the difficulties associated with the prior art. To this end, the applicants have investigated the problem of loss of quality and have discovered that the problem is associated with the presence of the enzyme "α-acid oxidase" in the hops. They have shown that the activity of the enzyme can be significantly reduced or halted in a number of ways.

Accordingly, the present invention provides an improved variety of hops characterized in that the hops exhibit no "α-acid oxidase" enzyme activity or significantly reduced "α-acid oxidase" activity.

According to a further aspect of the present invention there is provided a process for the production of hops which process comprises treating the hops in such a manner that the "α-acid oxidase" enzyme activity is significantly reduced or halted. In one form, the process comprises treating the fresh hops at high temperature for a period effective to reduce or halt "α-acid oxidase" enzyme activity. Temperatures of 80° C. or greater may be used. Desirably the heat treatment continues for one hour, or greater, preferably for about 1 to 2 hours but the period of treatment is related to the temperature at which treatment occurs.

In an alternative embodiment the "α-acid oxidase" enzyme may be chemically inactivated or its activity significantly reduced by chemical means. The hops may be treated with a chemical which acts to inactivate or reduce the activity of the "α-acid oxidase" by chelating means. For example, chelation may occur with a manganese co-factor present in the hops. Amines or amine derivatives may be used as the chemical inactivator. Ethylene-diamine-tetraacetic acid may be used. Treatment may be undertaken before or after drying of the hops.

In a further aspect of the present invention there is provided a process for preparing a hop-containing beverage which comprises utilizing an improved variety of hops as described above. It will be understood that due to the retention of the quality of the hops in the present circumstances the amount used may be less than is necessary in the state of manufacturing process.

The "α-acid oxidase" enzyme which has been discovered to be present in dried hops has the following characteristics.

Molecular weight—17,000 Daltons
Isoelectric point—3 and or 10
Michaelis Constant—$6 \times 10^{-3}$M
Inactivation Temperature—in vitro—100° C. for 1 hour The present invention will now be more fully described in relation to the following example. It should be understood however that this example is illustrative only and should be taken in no way to be restrictive on the scope the invention has disclosed above.

EXAMPLE

A sample of fresh mature hops was obtained and the enzyme activity thereof measured.

The enzyme activity is defined herein as the rate of oxygen consumption per milligram of protein in an extract prepared from acetone powder and tested against an α-acid substrate in a standard Warburg apparatus.

The enzyme activity of fresh mature hops was found to be typically 6 to 10 microliters oxygen per milligram protein per minute.

A sample of fresh mature hops was then subjected to heat treatment at 80° C. for one hour. The enzyme activity was again measured and found to be $4 \times 10^{-1}$ microliters of oxygen per milligram protein per minute. The reduction in enzyme activity was due to an inhibitor of alpha acid oxidase enzyme.

It is apparent that the enzyme activity has accordingly been significantly reduced and the loss of quality of the hops reduced substantially.

Three samples of beers were prepared. The first beer included hops which had been subject to a heat treatment at 65° for one hour. Sample 2 had been subject to a heat treatment at 80° C. for one hour. Sample 3 had been subject to a heat treatment at 80° C. for two hours. The beers were compared with standard control beers.

| COMMENTS ON TASTE TEST Compared to the Control Beer PF 82/20: | | |
|---|---|---|
| Sample 1 | Dried at 65° C. | Slightly lower afterbitter with improved smoothness and balance. Slightly increased levels of fatty acid and sweet caramalised flavours evident. Otherwise normal. |
| Sample 2 | Dried at 80° C. 1 hour | Slightly lacking in smoothness and marred by slight perceptions of musty, solvent-like and other off-flavours. |
| Sample 3 | Dried at 80° C. 2 hours | Similar to the control beer in both profile and appeal. |

Flavour volatiles analysis produced no results expected to cause detectable taste differences between any of the beers but there is some suggestion of compounds being produced by the high temperature drying, that would account for the observed minor taste differences detected.

Finally it is to be understood that various other modifications and/or alterations may be made without departing from the spirit of the present invention as outlined herein.

Having now described our invention what we claim as new and desire to secure by Letters Patent is:

1. A process for treating hops which comprises heating fresh hops to a temperature of at least 80° C. and maintaining said hops at a temperature of at least 80° C. for one to two hours to reduce or halt α-acid oxidase enzyme activity in said hops.

2. A process for treating hops according to claim 1 which further comprises mixing said hops with ethylene-diamine-tetra-acetic acid in an amount effective to halt or significantly reduce the activity of α-acid oxidase enzyme.

* * * * *